(12) United States Patent
Brix et al.

(10) Patent No.: US 9,278,310 B2
(45) Date of Patent: Mar. 8, 2016

(54) METHOD OF REDUCING NITROGEN OXIDES FROM COKE-OVEN FLUE GAS

(75) Inventors: Joerg Brix, Waltrop (DE); Friedrich Huhn, Ratingen (DE); Frank Krebber, Essen (DE)

(73) Assignee: TYSSENKRUPP UHDE GMBH, Dortmund (DE)

( * ) Notice: Subject to any disclaimer, the term of this patent is extended or adjusted under 35 U.S.C. 154(b) by 925 days.

(21) Appl. No.: 13/503,280

(22) PCT Filed: Oct. 26, 2010

(86) PCT No.: PCT/EP2010/066136
§ 371 (c)(1),
(2), (4) Date: Jun. 30, 2012

(87) PCT Pub. No.: WO2011/061042
PCT Pub. Date: May 26, 2011

(65) Prior Publication Data
US 2012/0261244 A1    Oct. 18, 2012

(30) Foreign Application Priority Data

Nov. 18, 2009  (DE) .................. 10 2009 053 747

(51) Int. Cl.
*B01D 53/56*     (2006.01)
*C10B 43/10*    (2006.01)
(Continued)

(52) U.S. Cl.
CPC ............ *B01D 53/56* (2013.01); *B01D 53/8631* (2013.01); *C10B 5/02* (2013.01);
(Continued)

(58) Field of Classification Search
None
See application file for complete search history.

(56) References Cited

U.S. PATENT DOCUMENTS 2,108,610  A  *  2/1938  Otto ................................ 201/2
2,158,710  A  *  5/1939  van der Hoeven ............ 202/241
(Continued)

FOREIGN PATENT DOCUMENTS

DE  1206849 A   12/1965
EP  0217045 A    4/1987
EP   217045 A2 *  4/1987

OTHER PUBLICATIONS

English Translation—EP 217045 A2 provided by Espacenet.*

*Primary Examiner* — Renee E Robinson
*Assistant Examiner* — Jonathan Miller
(74) *Attorney, Agent, or Firm* — Andrew Wilford

(57) ABSTRACT

The invention relates to a method for reducing nitrogen oxides from the exhaust gas of a coke oven, which has a plurality of coking chambers and heating walls, arranged between the coking chambers, with heating flues (12, 12') for the indirect heating of the coking chambers. A combustible gas (16), which consists entirely or partially of coke oven gas, is burned in the heating flues (12, 12'), thereby producing an exhaust gas which contains nitrogen oxides. A reducing agent is fed to the exhaust gas at a temperature between 700° C. and 1100° C. and the proportion of nitrogen oxide in the exhaust gas is reduced by a homogeneous gas reaction between the reducing agent and the nitrogen oxides. The exhaust gas is subsequently passed through a regenerator (4) for heat recovery. Furthermore, carbon deposits on hot parts of the combustible gas feed are burned with decarbonizing air, wherein, during a regenerator half-period in which the combustible gas feed to one heating flue (12') is stopped, the decarbonizing air is introduced into this heating flue (12') through the associated burner supply line and combustible gas nozzle (15') and is discharged from another heating flue (12) with the hot exhaust gas. According to the invention, metered amounts of the reducing agent are fed into the decarbonizing air and, together with it, brought into contact with the hot exhaust gas.

7 Claims, 3 Drawing Sheets

(51) Int. Cl.
*C10B 5/02* (2006.01)
*B01D 53/86* (2006.01)
*C10B 21/10* (2006.01)

(52) U.S. Cl.
CPC ............... *C10B 21/10* (2013.01); *C10B 43/10* (2013.01); *B01D 2251/2062* (2013.01); *Y02C 20/10* (2013.01); *Y02P 20/129* (2015.11)

(56) References Cited

U.S. PATENT DOCUMENTS

| 4,216,060 | A | | 8/1980 | Murata |
| 4,235,851 | A | | 11/1980 | Flockenhaus |
| 4,990,220 | A | * | 2/1991 | Nashan et al. ................ 202/139 |

* cited by examiner

METHOD OF REDUCING NITROGEN OXIDES FROM COKE-OVEN FLUE GAS

CROSS REFERENCE TO RELATED APPLICATIONS

This application is the US-national stage of PCT application PCT/EP2010/066136 filed 26 Oct. 2010, published 26 May 2011 as WO2011/061042, and claiming the priority of German patent application 102009053747.3 itself filed 18 Nov. 2009.

FIELD OF THE INVENTION

The invention relates to a method of reducing the nitrogen oxides from the flue gas of a coke oven having a plurality of coking chambers and heating walls with heating flues for the indirect heating of the coking chambers, the heating walls being between the coking chambers. A combustible gas composed entirely or partly of coke-oven gas is combusted in the heating flues and thereby produces a flue gas containing nitrogen oxides. A reducing agent is fed into the flue gas at a temperature of between 700° C. and 1100° C., and the nitrogen-oxide component of the flue gas is reduced by a homogeneous gas reaction between the reducing agent and the nitrogen oxides. The flue gas is then passed through a regenerator for heat recovery.

A method of this type was disclosed in EP 0 217 045. In the known method, the reducing agent is either sprayed or blown into the regenerator above the surface material layers. Nozzle lances composed of heat-resistant material are used for this purpose. Effecting a uniform distribution of the reducing agent is difficult in the zone in which the flue gas is still at a high temperature of, for example, 900° C. to 1100° C. The lance assembly required for this purpose is technically expensive. The flue gas containing the reducing agent is then passed through the regenerator for heat recovery, the regenerator surface material of which is provided in the form of a catalyst for the selective reduction of the nitrogen oxides at least within a temperature zone between 200° C. and 500° C.

In coke ovens, the coking chambers of which are heated with a rich gas, for example coke-oven gas or a combustible gas having a high coke-oven gas component, carbon deposits frequently form in the hot sections of the tubing through which rich gas flows, in particular, on the combustible-gas nozzles, and these deposits have to be regularly burned off by supplying degraphiting air. A known approach is to introduce the degraphiting air through appropriate burner supply lines during the time of the regenerator cycle in which the rich gas has been turned off in the burner arrangement.

OBJECT OF THE INVENTION

Against this background, the object of the invention is to reduce nitrogen oxides from the flue gas of a coke oven whose coking chambers are heated with a rich gas. Rich gas in this context refers to a high-calorific-value combustible gas that is composed entirely or in significant part of coke-oven gas. The purpose is also to remove carbon deposits.

SUMMARY OF THE INVENTION

Based on the method described above, the object is achieved according to the invention by burning the carbon deposits with degraphiting air on hot sections of the combustible gas supply, in that, during a regenerator half-period in which the combustible gas is not supplied to a heating flue, the degraphiting air is introduced through the combustible gas supply line and combustible-gas nozzle into this heating flue and is discharged together with the hot flue gas from another heating flue, and by metering the reducing agent into the degraphiting air and bringing it together with this air into contact with the hot flue gas.

According to the invention, the mixture of degraphiting air and reducing agent is introduced only during the heating phases through the connection lines into the respective combusting heating flues through change-over valves that are closed for the coke-oven gas but then opened for the degraphiting air, through the supply lines and the nozzle lines or passages, as well as through the coke-oven gas nozzles. As a result, a homogeneous gas reaction takes place in the temperature range between 700° C. and 1100° C., primarily between 900° C. and 1000° C., between the reducing agent and nitrogen oxides, thereby resulting in a reduction of nitrogen oxides. The addition of the reducing agent to the degraphiting air has two advantages. The method according to the invention exploits existing technical equipment. Supplying the reducing agent to the mixture with a degraphiting air stream through the existing combustible-gas nozzles provides a uniform contacting and mixing with the hot flue gas stream containing nitrogen oxides, and thus creates the precondition for an effective homogenous gas reaction.

A predefined volumetric flow rate of degraphiting air is generated by an air blower. The flow of reducing agent to be metered in is then gauged such that the concentration of reducing agent in the air stream remains below the concentration level of an ignitable mixture.

The reducing agent/air mixture used for degraphiting is provided in an air duct system that is connected with the combustible gas supply to a change-over valve, and where actuating the change-over valve alternately enables the combustible gas or the reducing agent/air mixture to be supplied to the combustible-gas nozzle.

The regenerator for recovering heat comprises multiple individual cells that are below the heating flues. In a preferred embodiment of the method according to the invention, at least the end regenerator cells accessible from the outside contain regenerator layers on the coke side of the coking chambers and the machine side of the coking chambers, which layers have a coating that acts as a catalyst for the selective reduction of nitrogen oxides in a temperature range between 200° C. and 500° C. The regenerator layers of the end regenerator cells are preferably held in replaceable cassettes.

The method according to the invention can be used both in coke ovens that are designed as so-called underjet types, but also in so-called top-heated coke ovens or coke ovens with side burners. The method according to the invention is well suited for coke ovens in mining-based coking plants that are operated using only rich gas. In addition, the method according to the invention can, however, also be used in coke ovens that are operated in combined fashion with a smelting plant as so-called compound ovens and can be heated both with lean gas as well as rich gas. The method according to the invention can always be used whenever equipment is present to enable the burning off carbon deposits on the hot sections of the combustible gas supply lines.

BRIEF DESCRIPTION OF THE DRAWING

The following describes the invention in more detail with reference to a drawing showing only one embodiment. Therein.

SPECIFIC DESCRIPTION OF THE INVENTION

Figure 1:
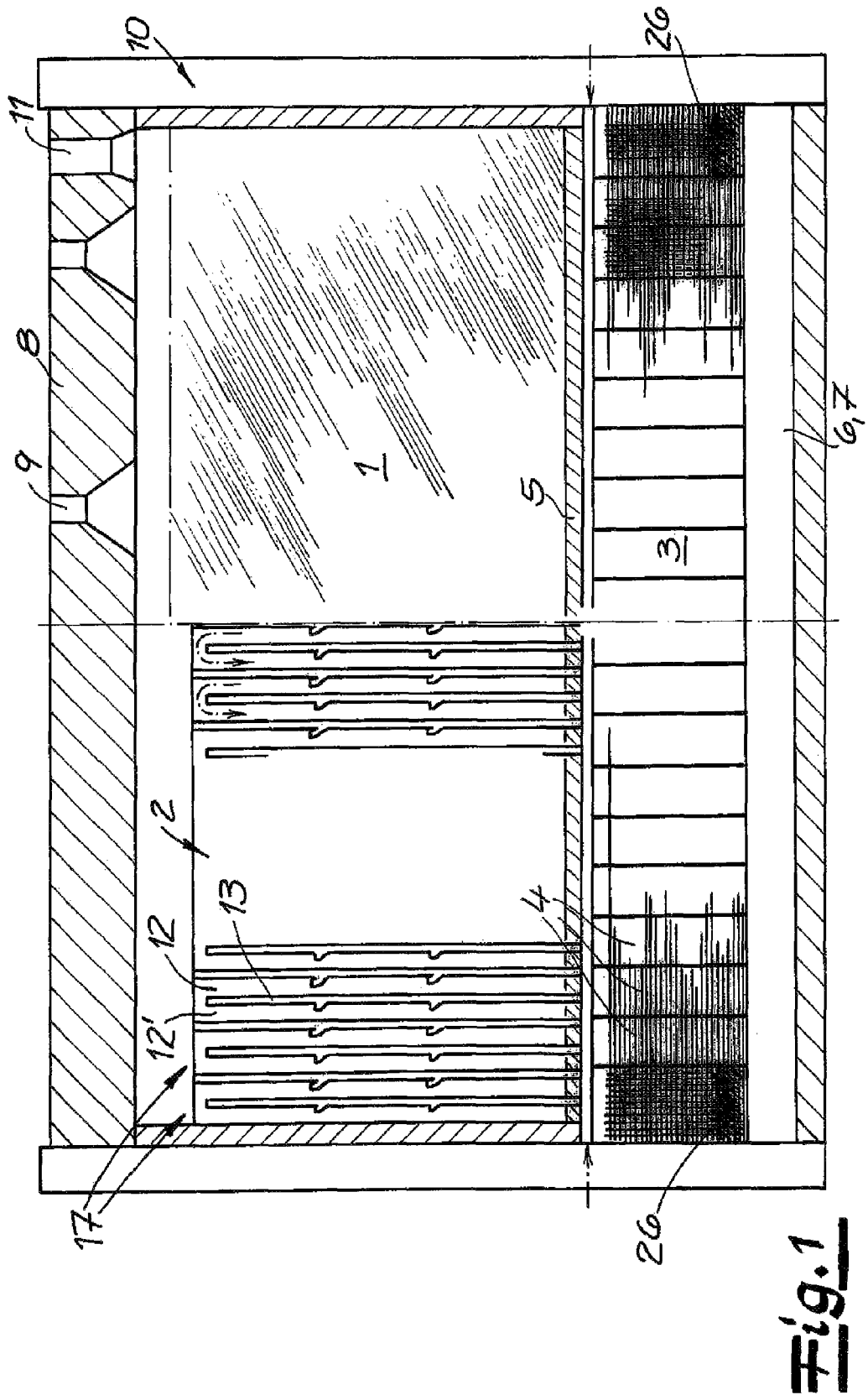
FIG. 1 shows a heating system for a coke oven.

FIG. 1 relates to a coke oven that has a plurality of coking chambers and heating walls with heating flues between the coking chambers for the indirect heating of the coking chambers, and shows in various sectional planes: a section through one of the coking chambers 1 in the right half of the figure, a section through a heating wall 2 in the left half of the figure, and a section through the lower furnace 3 with regenerators 4 for heat recovery in the bottom half of the figure. The coking chambers 1 are separated by a partition ceiling 5 from the lower furnace 3. Floor flues 6 and 7, for air and flue gas run below the regenerators.

The coking chambers 1 of the coke oven are charged from above through charging openings 9 in an oven ceiling 8. The finished coke is pushed out laterally on a coke side 10. Accumulating raw gas is discharged through standpipes 11 into a receiver. The heating walls 2 with their heating flues that are lined with high-temperature-resistant bricks 12 and 12' are located between the coking chambers 1. Partitions 13 between the heating flues 12 are formed by hollow connectors that create passages for air or flue gas and connect through openings with the heating flues 12. Combustible-gas nozzles 15 at the bottom ends of the heating flues 12 are connected to a combustible-gas supply lines 19. The combustible gas lines 19 are provided, for example, in the partition ceiling 5 of the coke oven.

Figure 2:
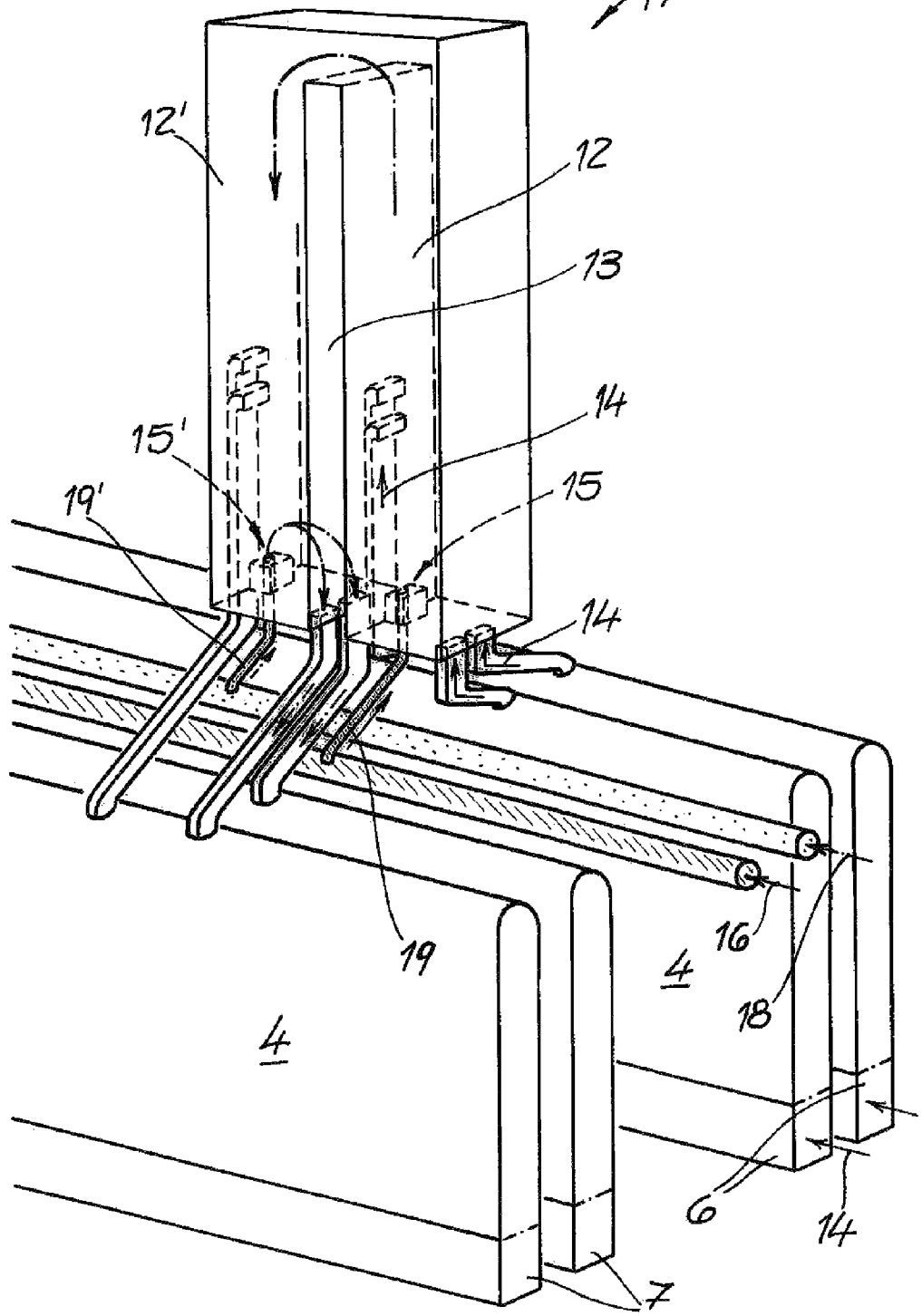
FIG. 2 shows a dual heating flue of the heating system shown in FIG. 1.

The heating flues 12 and 12' are connected in pairs to form dual heating flues 17. The flow configuration in this type of dual heating flue is shown in FIG. 2. Air 14 flowing in through the floor flue 6 is passed through the regenerators 4 and preheated. The preheated air 14 enters through floor air openings and through additional openings along the height of the heating flue into the first heating flue 12 of the dual heating flue 17. The combustible gas 16, which is a rich gas composed entirely or at least in significant part of coke-oven gas, moves through a combustible-gas line to a burner-supply line 19 associated with the heating flue and is introduced into the heating flue 12 through a combustible-gas nozzle 15 at the bottom of the heating flue 12. The combustible gas 16 is combusted there with the oxygen of the air introduced into the heating flue 12. The flue gas that due to its high temperature contains nitrogen oxides passes at the top into the second heating flue 12' of the dual heating flue 17, flows down through it, then leaves the second heating flue 12' through the air openings of the flue. The flue gas stream flows through the regenerators 4 associated with second heating flue 12', transfers heat to them, and is discharged in the floor flues 7 at a temperature of from 200° C. to 280° C. and rarely exceeding this range.

As the coking chambers are heated with rich gas, i.e. coke-oven gas or a combustible gas that contains a significant fraction of coke-oven gas, carbon is formed that is deposited on the hot sections of the conduits through which the rich gas flows, in particular, on the combustible-gas nozzles 15, and this carbon must be burned off at regular intervals by the addition of degraphiting air. The degraphiting air is introduced into this heating flue 12' through the associated burner supply line 19 and combustible-gas nozzle 15' during the regenerator half-period in which the combustible gas supply to one heating flue 12 and 12' is turned off, and is discharged together with the hot flue gas from the other heating flue 12 of the dual heating flue 17.

In order to reduce the nitrogen oxide content of the flue gas, a reducing agent is metered into the degraphiting air, and together with it is brought into contact with the hot flue gas that is at a temperature of between 700° C. and 1100° C. The reducing agent used is preferably ammonia.

Figure 3:
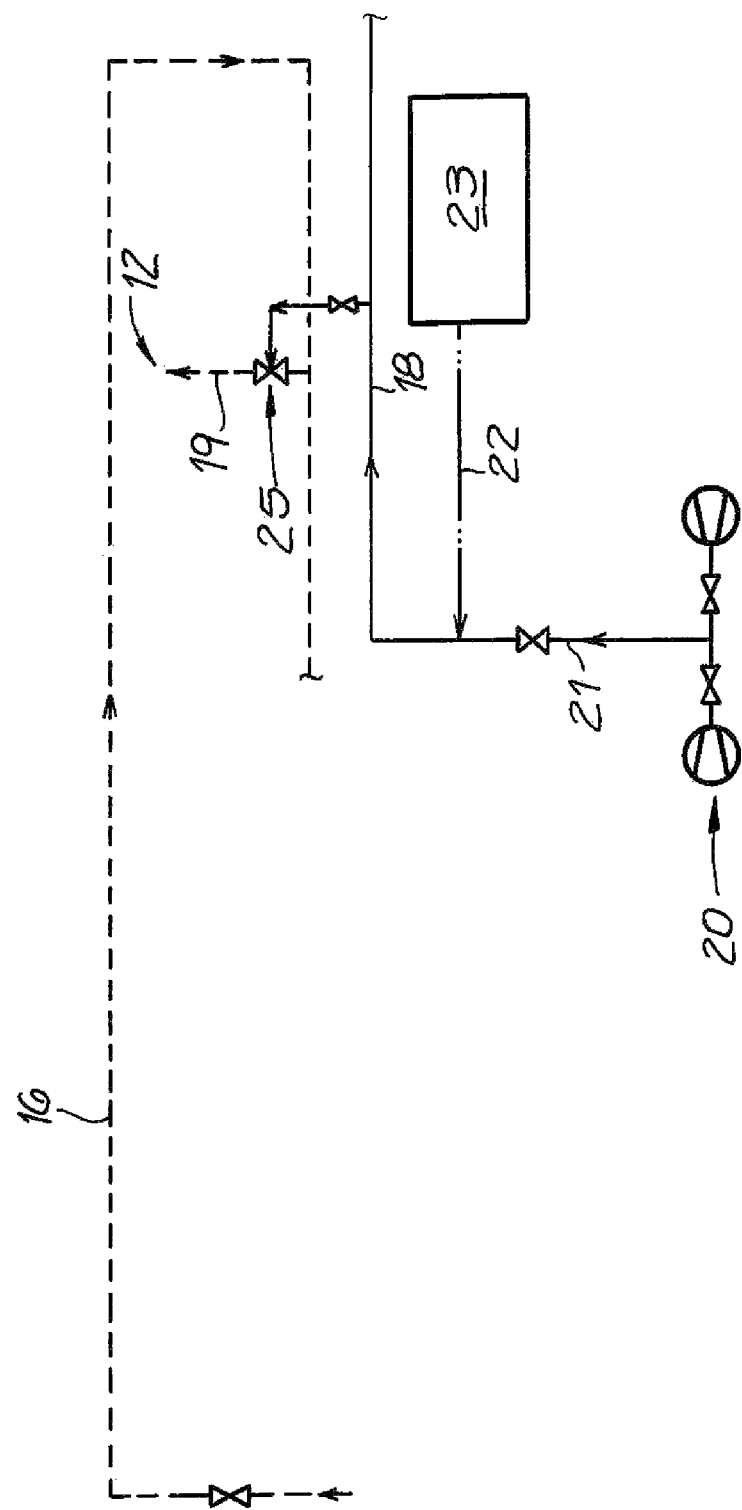
FIG. 3 is a schematic view of a degraphiting air system comprising a metering station for the reducing agent used to implement a method for reducing nitrogen oxides that come from coke-oven flue gas.

FIG. 3 in particular reveals that a defined volumetric flow 21 of degraphiting air is generated by an air blower 20, or a blower arrangement that can comprise multiple air blowers, and a defined flow 22 of reducing agent is metered into this flow of air, the quantity of which is gauged so that the concentration of the reducing agent in the air flow remains below the concentration of an ignitable mixture. When using ammonia, the maximum concentration of $NH_3$ in the degraphiting air must be 2% by volume. Ammonia is supplied to the degraphiting air in a vaporous state and generated in a vaporization unit 23. The flow 22 of reducing agent and volumetric flow 21 of air are control parameters of a controlled process.

The reducing agent/air mixture 18 used for degraphiting is supplied in an air duct system that like the combustible gas supply is connected to a change-over control valve 25 in the form of a 3-way valve. Actuating the change-over valve 25 alternately enables the combustible gas 16 or the reducing agent/air mixture 18 to be supplied to the combustible-gas nozzle 15 of heating flue 12.

FIG. 1 shows that in order to recover heat, the regenerator 4 comprises multiple individual cells that are below the heating flues. On the coke side of the coking chambers and the machine side of the coking chambers, at least the end regenerator cells accessible from the outside each contain regenerator layers 26 having a coating that acts as a catalyst for the selective reduction of nitrogen oxides within a temperature range of between 200° C. and 500° C. The regenerator layers 26 acting as the catalyst of the end regenerator cells are held in replaceable cassettes.

The invention claimed is:

1. A method of reducing nitrogen oxides from a flue gas of a coke oven that has a plurality of coking chambers and heating walls with paired heating flues connected in series with twin heating flues for the indirect heating of the coking chambers, the heating walls being between the coking chambers, the method comprising the steps of:

burning a combustible gas composed entirely or partly of coke-oven gas in the heating flues to produce a flue gas that contains nitrogen oxides, feeding a reducing agent into the flue gas at a temperature of between 700° C. and 1100° C. so as to reduce the nitrogen-oxide component of the flue gas by a homogeneous gas reaction between the reducing agent and the nitrogen oxides, passing the flue gas through a regenerator for heat recovery, burning off carbon deposits on hot sections of the combustible gas supply with degraphiting air, introducing the degraphiting air during a regenerator half-period in which the combustible gas supply to a heating flue is turned off through a burner supply line and combustible-gas nozzle into this heating flue, and discharging the degraphiting air together with the hot flue gas from another heating flue, and metering the reducing agent into the degraphiting air and bringing the reducing agent together with the degraphiting air into contact with the hot flue gas to restrict the reducing agent to a concentration below that necessary for a reaction between the reducing agent and the degraphiting air.

2. The method according to claim 1, wherein ammonia is used as the reducing agent.

3. The method according to claim 1, further comprising the step of:
   generating a defined volumetric flow of degraphiting air by an air blower, and
   gauging the flow of reducing agent to be metered in so that the concentration of the reducing agent in the air flow remains below the concentration of an ignitable mixture.

4. The method according to claim 1, further comprising the step of:
   supplying the reducing agent/air mixture used for degraphiting in an air duct system that is connected with the combustible gas supply to a change-over valve, and
   actuating the change-over valve alternately to enable combustible gas or the reducing agent/air mixture to be supplied to the combustible-gas nozzle of the heating flue.

5. The method according to claim 1, further comprising the step of:
   using a regenerator comprising multiple individual cells for heat recovery, the individual cells being under the heating flues, and on the coke side of the coking chambers and the machine side of the coking chambers at least the end regenerator cells accessible from the outside each have regenerator layers with a coating that acts as a catalyst for the selective reduction of the nitrogen oxides in a temperature range between 200° C. and 500° C.

6. The method according to claim 5, wherein the regenerator layers of the end regenerator cells that act as a catalyst are held in replaceable cassettes.

7. The method according to claim 2, further comprising the step of:
   restricting a maximum concentration of ammonia in the degraphiting air to 2% by volume.

* * * * *